United States Patent [19]

Johnson

[11] Patent Number: 5,448,265
[45] Date of Patent: Sep. 5, 1995

[54] PRINTER WITH EXPOSURE-LINE COMPENSATOR

[75] Inventor: Bruce K. Johnson, Andover, Mass.

[73] Assignee: Polaroid Corporation, Cambridge, Mass.

[21] Appl. No.: 954,738

[22] Filed: Sep. 30, 1992

[51] Int. Cl.⁶ ............................................. B41J 2/435
[52] U.S. Cl. .................................................. 347/248
[58] Field of Search ................ 346/108, 1.1, 107 R, 346/160

[56] References Cited

U.S. PATENT DOCUMENTS

| | | | |
|---|---|---|---|
| 3,372,282 | 3/1968 | Bressler | 250/236 |
| 3,514,619 | 5/1970 | Ireland | 250/235 |
| 3,685,886 | 8/1972 | Nakajima et al. | 350/315 |
| 3,720,454 | 3/1973 | Inderhees | 350/7 |
| 4,230,405 | 10/1980 | Kurtz | 355/214 |
| 4,273,410 | 6/1981 | Menke | 350/6.2 |
| 4,473,848 | 9/1984 | Juergensen | 358/294 |
| 4,636,043 | 1/1987 | Bellar | 350/484 |
| 4,725,891 | 2/1988 | Manian | 358/285 |
| 4,855,818 | 8/1989 | Morimoto et al. | 358/75 |
| 4,899,175 | 2/1990 | Harada et al. | 346/108 |
| 5,040,861 | 8/1991 | Chu | 359/17 |

Primary Examiner—Mark J. Reinhart
Attorney, Agent, or Firm—Christopher P. Ricci

[57] ABSTRACT

An optical printer, suitable for use in printing upon a recording medium, includes a tubular compensator disposed between a print head and the recording medium. The print head directs an elongated exposing beam through the compensator to impinge upon the medium, and the beam effects a line exposure across the medium. A transport device introduces relative motion between the medium and the print head during a line exposure by the beam. The relative motion is perpendicular to the exposure line and introduces a smear to each exposure line as well as an overlap between exposure lines. The tubular compensator includes inner and outer cylindrical surfaces having centers of curvature displaced relative to each other resulting in a wedge-like cross-section to a wall of the tubular compensator. The wedge angle varies with rotation of the compensator to provide for a linear deflection of the beam during a line exposure by the beam, thereby offsetting the advancement of the medium during the line exposure.

19 Claims, 6 Drawing Sheets

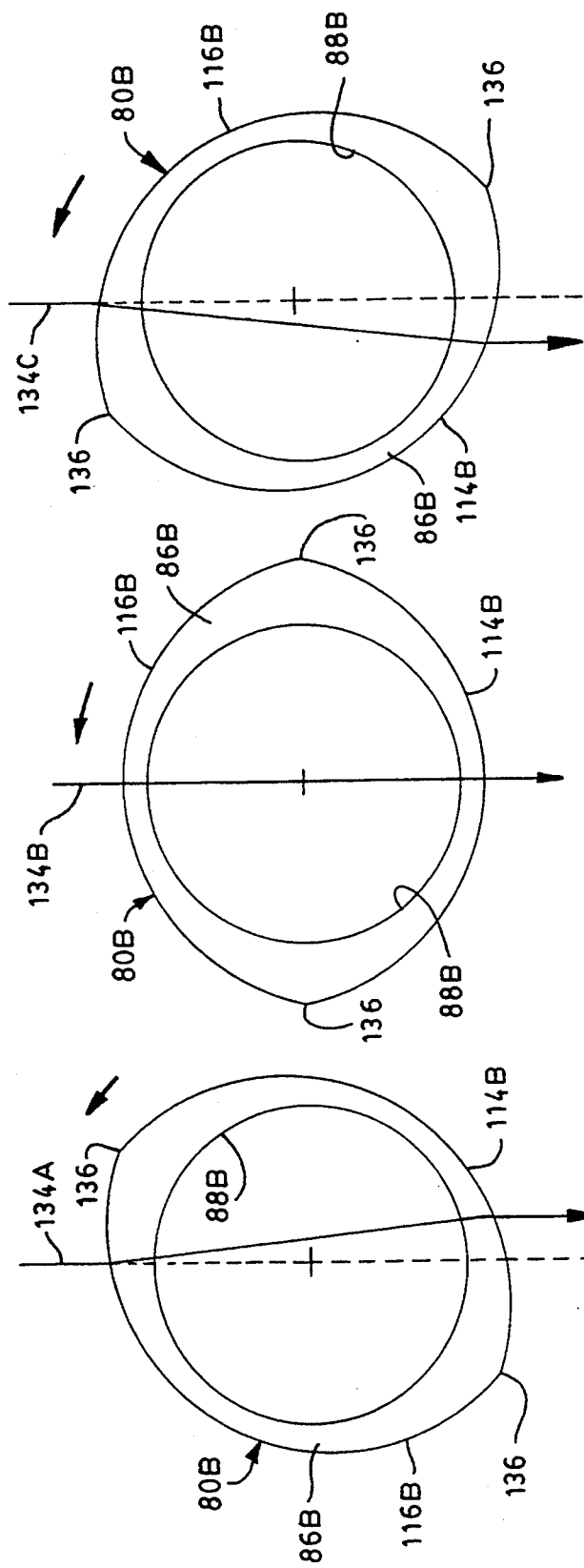

PRINTER WITH EXPOSURE-LINE COMPENSATOR

BACKGROUND OF THE INVENTION

This invention relates to optical printers, suitable for printing images and text on a print medium and, more particularly, to a printer wherein the print medium is moving in a first direction relative to a linear print head as the print head optically prints a line of print in a second direction perpendicular to the first direction. The printer includes an optical compensation element operative to progressively displace a line of print to negate any smear of the line resulting from the two directions of movement.

Printers are employed in a variety of applications, including the printing of documents and/or photographic images. In a common form of construction, the printer operates optically by exposing succeeding lines of print in a print medium. Typically, the line of print is a sequence of black and white marks on the print medium representing a portion of a line of alphanumeric characters or a line of pixels of an image. For example, in one type of printing apparatus, a linear light bar may extend across a photosensitive surface of the print medium in a direction perpendicular to the direction of movement of the medium to produce a line at each point of movement of the light bar relative to the medium. Thus, there is a two-dimensional scanning of the light bar across the print medium in the sense that the print medium is advancing in a first direction while the light bar extends across the medium in a second direction perpendicular to the first direction.

A problem arises in that, during a two-dimensional scanning of the print medium, the print medium continuously advances, even during the interval of time during which the light bar is exposing transversely across the medium, Therefore, the width of each exposed line becomes extended as a result of the continual advancement of the print medium, or page of print during line exposure, this resulting in a smearing of each print line and an overlap of succeeding adjacent lines. In the absence of some form of compensation for the smear, a resulting printed text or image is degraded.

SUMMARY OF THE INVENTION

The aforementioned problem is overcome and other advantages are provided by a printer including an optical print-line compensator which, in accordance with the invention, continuously introduces a progressively expanding displacement of each print line concurrently with the movement of the print medium, thereby to compensate for the continual movement of the medium. In this way, the linear exposing light beam is moved in the same direction as the movement of the print medium, thereby to maintain the track of the linear light beam along its desired narrow print line perpendicular to the sides of the print medium.

In accordance with an important feature of the invention, the compensation is accomplished optically by means of a circular cylindrical drum of transparent material, such as glass, wherein the optical element has the form of a tube with an encircling tubular wall having an inner surface and an outer surface. The cylindrical axis of the optical element is disposed parallel to a surface of the print medium, and extends perpendicularly to the sides of the print medium. The optical element is rotated about the cylindrical axis in synchronism with progression of the medium in the direction of movement of the medium relative to the print head. The linear light beam is directed through the optical element to the medium.

In accordance with the invention, one of the foregoing tubular surfaces is constructed of a single circular cylindrical surface, while the other of the two tubular surfaces is constructed of two semicircular cylindrical surfaces having centers which are displaced on opposite sides of the center of the circular cylindrical surface. This creates a wedge-like optical path to a light beam propagating through the tubular optical element resulting in a displacement of the light beam. The amount of rotation of the tubular optical element is adjusted to derive a desired amount of displacement of the light beam which matches the displacement of the print medium during a print line, thereby to continue the width of the print line to be substantially no greater than the width of the exposing linear light beam.

In a preferred embodiment of the invention, the outer surface of the tubular cylindrical element is composed of a singular circular cylindrical surface, while the inner surface of the tubular optical element comprises the two displaced semicircular cylindrical surfaces. The tubular element may be fabricated with periodically positioned regions of red, green and blue colored filter material for use in printing and reading color images.

BRIEF DESCRIPTION OF THE DRAWINGS

The aforementioned aspects and other features of the invention are explained in the following description, taken in connection with the accompanying drawings wherein:

FIGS. 8A–8C show an alternative embodiment of the compensator in different orientations relative to an exposing light beam.

DETAILED DESCRIPTION

Figure 1:
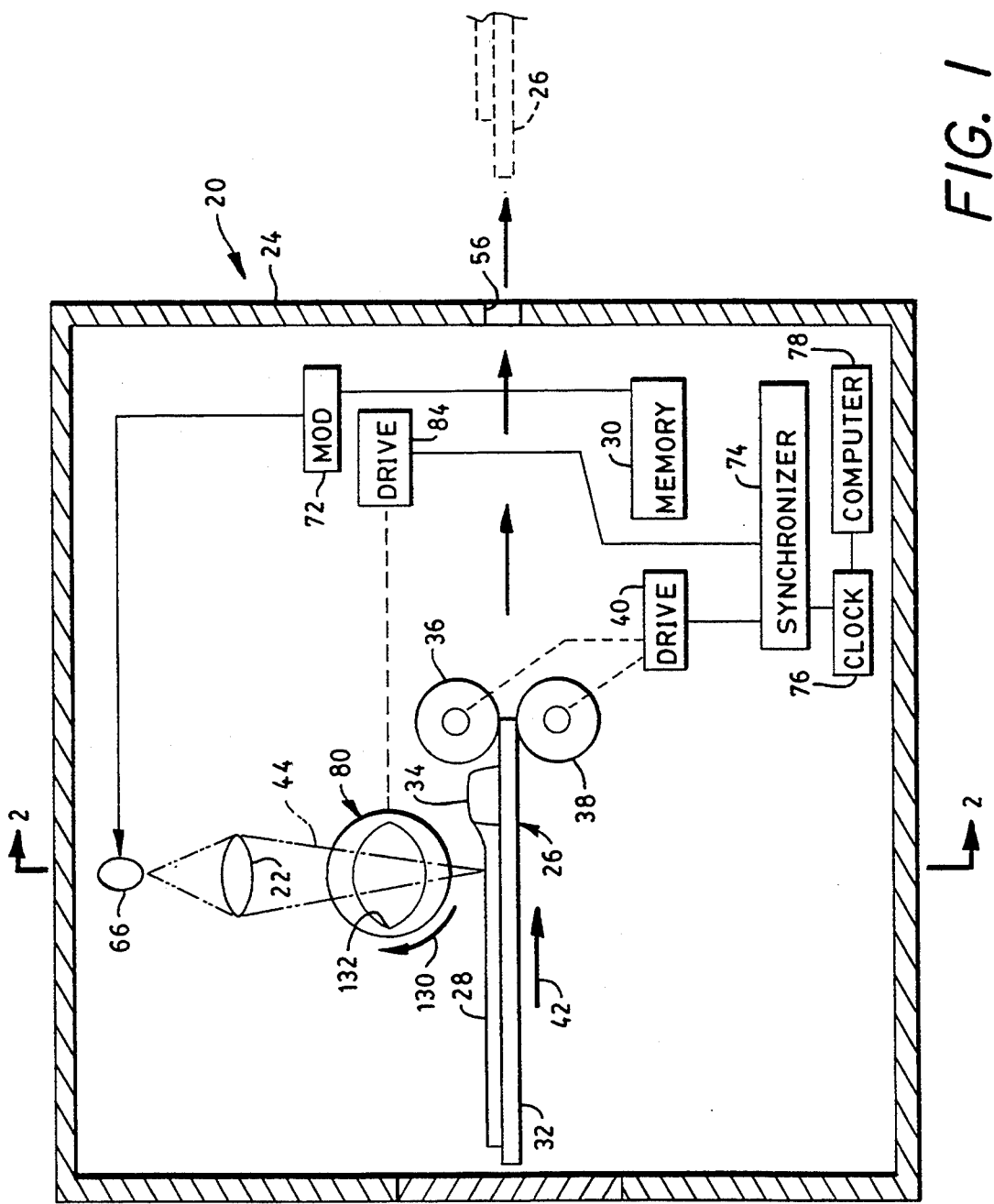
FIG. 1 is a diagrammatic elevational view, partially in section, of a printer employing an optical compensator in accordance with the invention.
Figure 2:
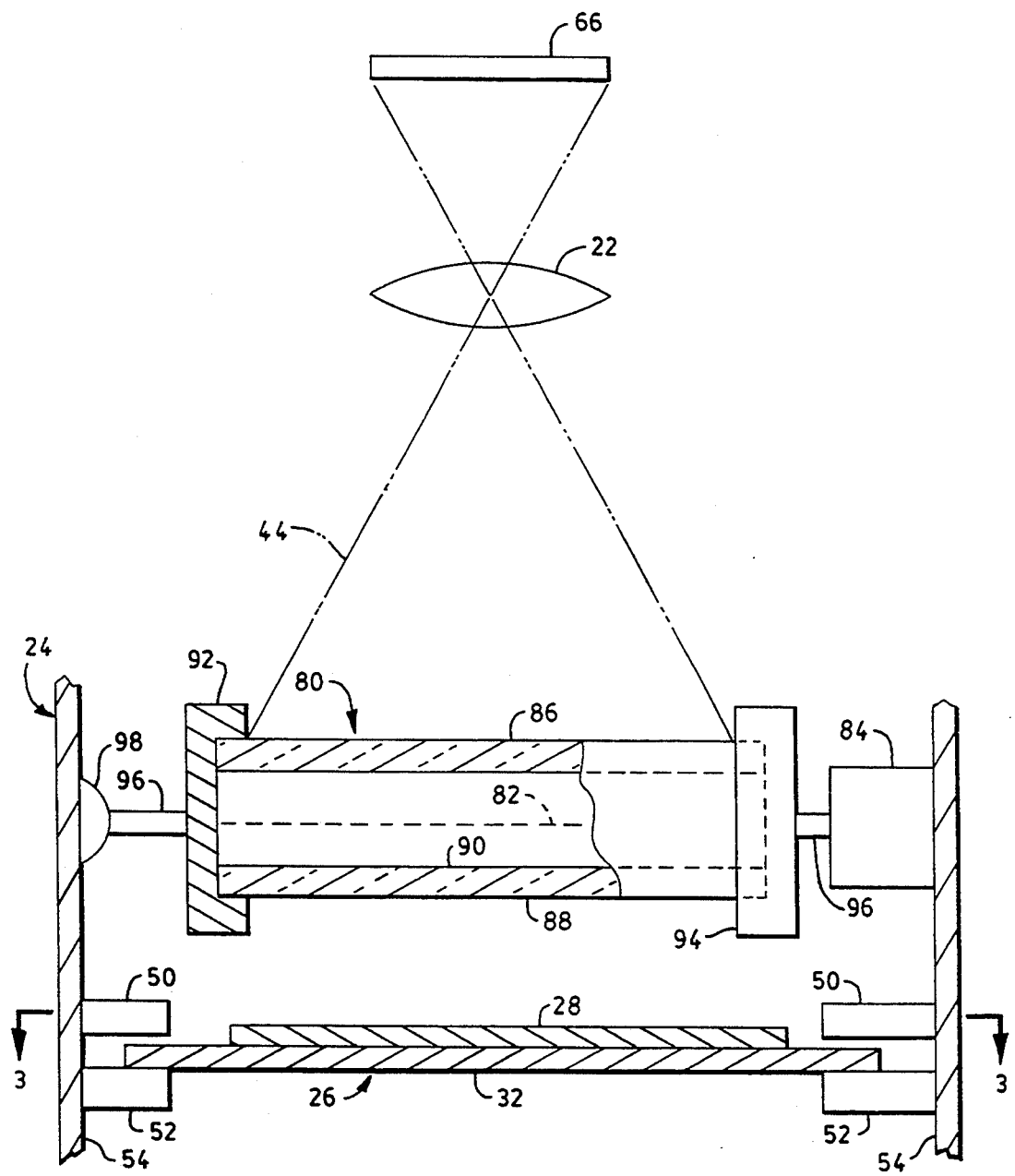
FIG. 2 is an enlarged view, taken along the line 2—2 of FIG. 1, showing the printer and optical compensator of the invention.
Figure 3:
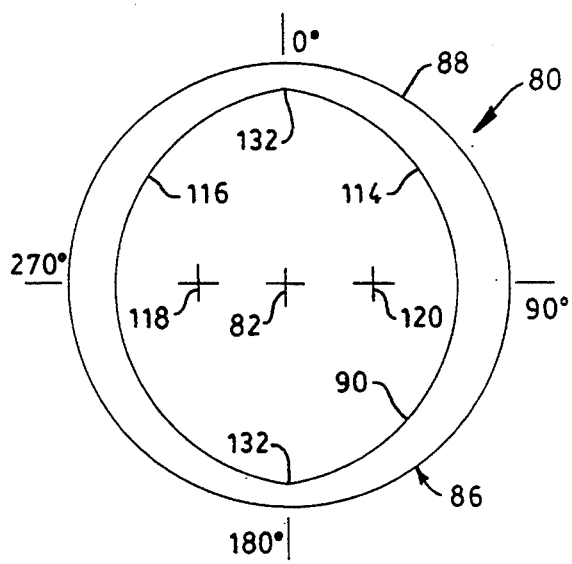
FIG. 3 is an end view of a tubular wall of the compensator of FIGS. 1 and 2.

With reference to FIGS. 1–3, the principles of the invention are demonstrated by means of an optical printer 20 employing an optical system 22 enclosed within a housing 24. While the printer 20 may be employed for printing images, such as alphanumeric characters and pictorial representations of subject matter, both in monochrome or in color, the printer 20 is demonstrated for the situation wherein a photographic film unit 26 is to be imprinted with the image of a subject. The subject may be provided on a photograph which is to be scanned to provide input data to the printer 20 for imprinting upon a recording medium such as a sheet 28 of photosensitive film or, alternatively, as shown in FIG. 1, the data to be printed on the sheet 28 is stored electronically in a memory 30. In the memory 30, each pixel of the image to be printed is represented by a digital signal having intensity data, and also color data in the event that the image is to be printed in color. The film unit 26 may be of a standard form used in instant photography, such as that marketed by the Polaroid Corporation of Cambridge, Massachusetts, and is provided with a backing layer 32 of relatively stiff material to support the film sheet 28, and a packet 34 of chemicals to be employed in the development of an image printed optically upon the sheet 28. The packet 34 is disposed at a front end of the backing layer 32 to be crushed by a pair of rollers 36 and 38 upon advancement of the film unit 26 into the nip of the rollers 36 and 38 in the printer 20. The crushing of the packet 34 by the rollers 36 and 38 expels the chemicals from the packet 34 and dispenses the chemicals along the film sheet 28 in a well-known manner.

In the operation of the printer 20, the rollers 36 and 38 are rotated by a drive unit 40. Mechanical connection of the drive unit 40 to the rollers 36 and 38 is indicated by dashed lines. Upon activation of the drive unit 40, and upon advancement of the film unit 26 to the nip between the rollers 36 and 38, the rollers 36 and 38 frictionally engage the front of the film unit 36 to advance the film unit 26, in the direction of an arrow 42, past a linear light beam 44 which is imaged by an appropriate lens assembly 22 across the film unit 26 in a direction transverse to the direction of movement of the film unit 26. The linear light beam 44 may be provided by a linear light bar 66 which may comprise a deformable mirror device (DMD) or a vacuum fluorescent device or other alternative device as is well known in the art. Upper and lower guide arms 50 and 52 are provided on opposed side walls 54 of the housing 24 for receiving edge portions of the film unit 36 during advancement of the film unit 26 through the housing 24 by rotation of the rollers 36 and 38, thereby to steady the film unit 26 during passage of the sheet 28 past the light beam 44. Upon completion of the printing process, the front edge of the film unit 36 extends through an exit slot 56 of the housing 24 to enable manual retrieval of the film unit 26, a retrieved film unit 26 being indicated in phantom view to the right of the slot 56.

The lens assembly 22 serves to focus light emitted by the linear light bar 66 upon the film sheet 28 when the film sheet 28 is disposed in the path of the light beam 44. The light bar 66 is driven via a modulator 72 to provide pulses of light along the length of the beam 44, an input terminal of the modulator 72 being provided with image data stored in the memory 30. The optical path of the light beam extends from the light bar, via the lens assembly to the film sheet 28. The printer 20 includes a synchronizer 74 for synchronizing the rotational speeds of the rollers 36 and 38 with a rate of outputting of data of each image pixel from the memory 30. Also included in the printer 20 is a clock 76 and a computer 78. The computer 78 provides the printer 20 with the capacity of providing a desired number of lines of image data upon the sheet 28 per unit of displacement of the sheet 28, such as a specific number of lines per centimeter of displacement of the sheet 28. A clock 76 provides clock signals to the computer 78 and the synchronizer 74 for synchronizing operation of all of the components of the printer 20.

In accordance with the invention, the optical system further comprises a compensator 80 having a tubular shape bounded by inner and outer cylindrical surfaces, and disposed about a central axis 82 (FIG. 2) for adjusting the orientation of a line on the film sheet 28 to compensate for the continuous movement of the beam 44 relative to the sheet 28. The compensator 80 is located in the path of the light beam 44 so that the light beam 44 propagates through the compensator 80. The compensator 80 is rotated about the axis 82 by a drive motor 84. Rotation of the compensator 80 is synchronized with rotation of the rollers 36 and 38 by the synchronizer 74, the synchronizer 74 being connected to the drive unit 84 as well as to the drive unit 40, the scan motor 60 and the memory 30.

As shown in FIGS. 2 and 3, the compensator 80 comprises a tubular wall 86 having an outer surface 88 and an inner surface 90. The wall 86 is held within end caps 92 and 94 which may be secured by an adhesive (not shown) to opposed end portions of the wall 86. A portion of the compensator 80 is shown in sectional view in FIG. 2 to facilitate visualization of both the interior and the exterior of the compensator 80. The tubular wall 86 is fabricated of a transparent material, such as glass or polycarbonate, by way of example, and the end caps 92 and 94 may be fabricated of a rigid material such as metal. The end cap 92 connects via shaft 96 to the drive motor 84, and upon electrical activation of the motor 84 the motor imparts rotation to the compensator 80. It will be readily understood that other types of well-known drive mechanisms can also be used in place of the aforementioned motor.

Figure 5A:
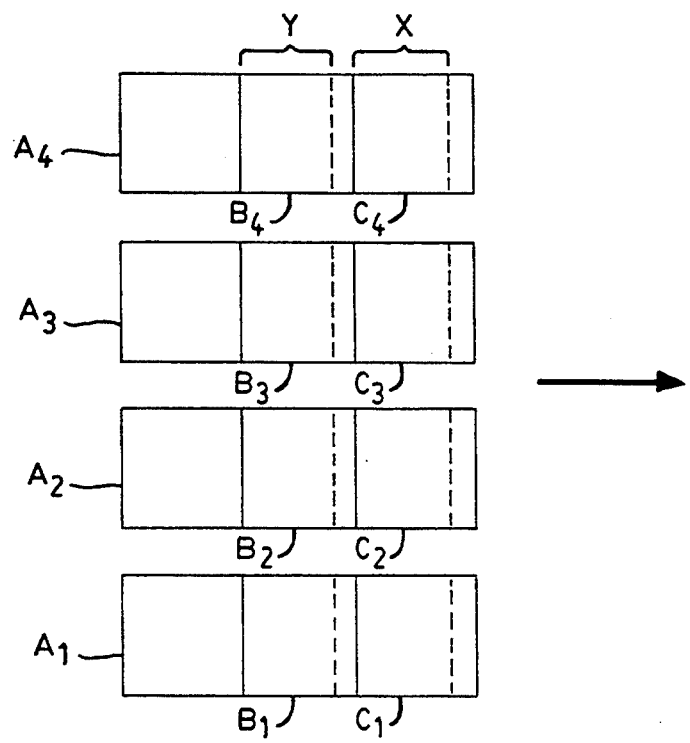
FIG. 5A shows pixels exposed in the conventional manner resulting in smear and overlap.
Figure 5B:
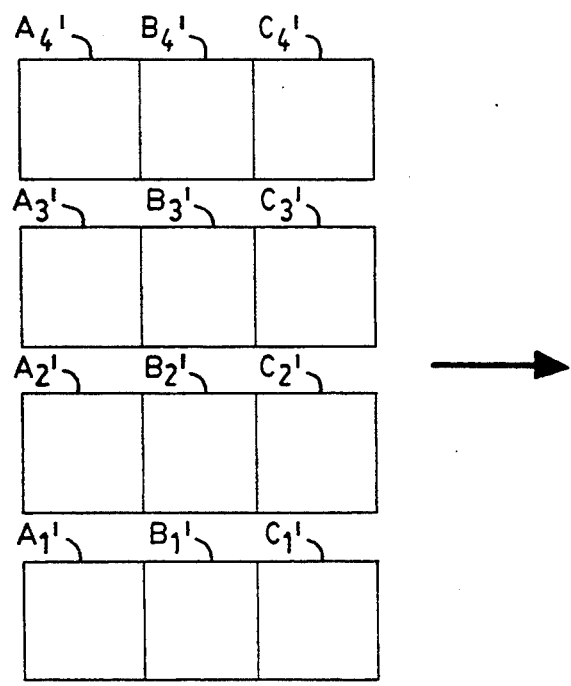
FIG. 5B shows pixels exposed in the manner of this invention so as to eliminate the smear and overlap of FIG. 5A.

The compensatory function provided by the compensator 80 is explained with reference to FIGS. 5A and 5B. FIG. 5A shows the exposure of three rows of pixels of the film sheet 28 of the film unit 26 by the light beam 44 without the compensator 80 of this invention. As the film sheet 28 is advanced, it comes to the region of illumination by the light beam 44. In the absence of the compensator 80, or in the event that the compensator 80 is stationary, the width of each line exposure provided by the beam 44 is extended as shown by the wide overlapping exposed pixels $A_1$-$C_4$ in FIG. 5A. During each line exposure of the beam 44, the film sheet 28 is advancing to the right as shown by the arrow. As a result, by the time the beam 44 has finished a line exposure on the film sheet 28, the film sheet 28 has advanced so that the trailing edge of each pixel in the exposed line occurs at a location more distant from the front edge of the pixel than would otherwise occur were the film sheet stationary during the line exposure. As a result, the scan line of markings on the film are wider than the exposing beam width resulting in a smearing and overlapping of adjacent line exposures as shown at y and x. The function of the compensator 80 is to continuously and progressively offset the differential movement between the exposing beam 44 and the film sheet 28 at a rate equal to the rate of motion of the film 28 so that each line exposure, in essence, follows the movement of the film 28. This nulls out the differential movement between the exposing beam 44 and the film sheet 28 to produce a compensated scan line which has a desired narrow width without overlap as shown by the exposed lines $A_1$–$C_4$ in FIG. 5B. The amount of compensatory offset provided to the beam position depends on the physical construction of the compensator 80, and on the rate of rotation of the compensator 80, as is now described.

FIG. 3 shows an end view of the tubular wall 86 of the compensator 80. In the end view, the outer surface 88 of the compensator 80 has the form of a circle centered on the central axis 82. The inner surface 90 is composed of a first semicircular cylindrical surface 114 and a second semicircular cylindrical surface 116. In the end view, the first semicircular cylindrical surface 114 appears as a semicircle constructed about a center 118. Similarly, the second semicircular cylindrical surface 116, in the end view, appears as a semicircle constructed about a center 120. The radii of curvature of the first and the second semicircular cylindrical surfaces 114 and 116 are equal, and are smaller than the radius of curvature of the outer circular surface 88. The centers of curvature 118 and 120 of the surfaces 114 and 116, respectively, are displaced from the axis 82 along a central horizontal diametric plane through the 90° and 270° locations of the tubular wall 86 such that central portions of the surfaces 114 and 116 are displaced towards each other. There results a widening of the tubular wall 86 along the central diametric plane, and a narrowing of the tubular wall 86 along a vertical reference plane perpendicular to the central plane. The locations about the periphery of the tubular wall 86 may be identified in terms of angle of rotation from the top portion of FIG. 3 at the vertical reference plane, this location being designated as zero degrees. Ninety degrees of rotation is located to the right at the intersection of the wall 86 with the central horizontal plane 122, 180 degrees is at the bottom of the figure, and 270 degrees is at the left side of the figure. An interface between the semicircular surfaces 114 and 116 provides for two cusps 132 of the inner surface 90 at the locations of zero degrees and 180 degrees.

Figure 4A:
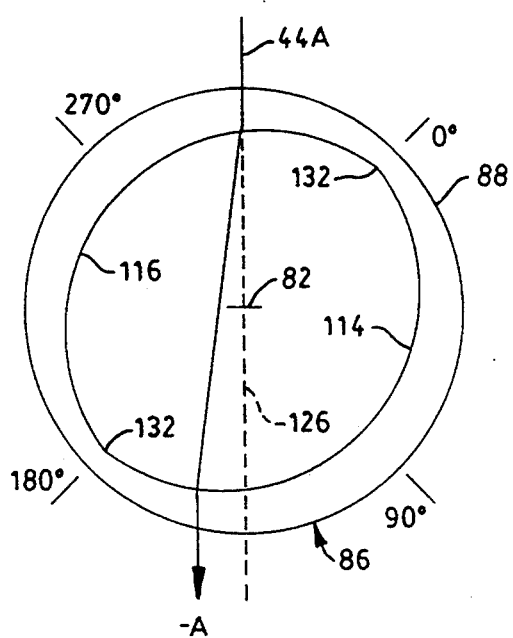
FIGS. 4A–4C show the end view of the tubular wall of the compensator of FIG. 3 in different orientations relative to an exposing light beam.
Figure 4B:
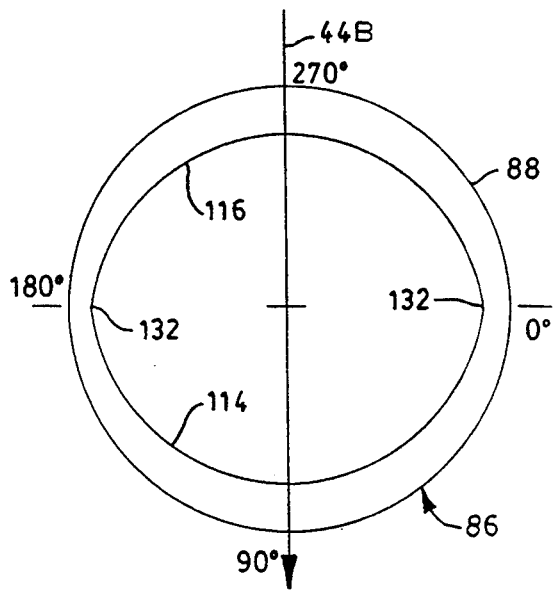
Figure 4C:
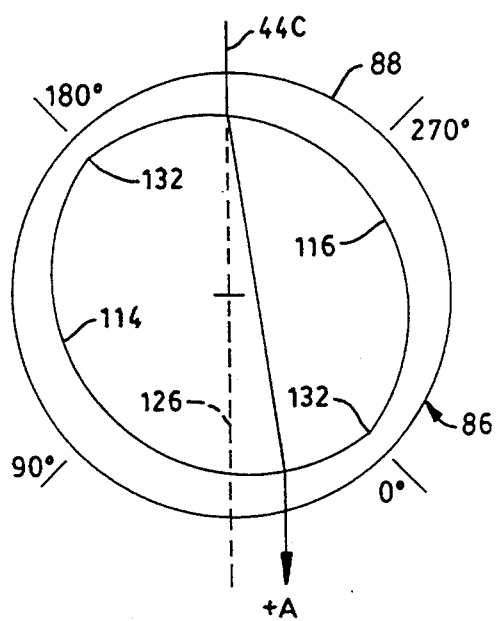

The variation in the thickness of the tubular wall 86 presents the effect of a wedge to a beam of light propagating through the compensator 80. By way of example, three such beams of light, 44A, 44B, and 44C are shown in FIGS. 4A, 4B and 4C, respectively, with the compensator 80 oriented at different angles. The effect of the variation on thickness of the tubular wall 86 is as follows. The beam 44A is incident normally on the outer surface 88 and exits the semicircular surface 116 at an angle less than 90°, and similarly intercepts the semicircular surface 114 at an angle less than 90° to exit the compensator with a slight offset relative to the diameter 126. Thus, the beam 44A propagates through the compensator 80 and experiences a slight bending at each interior interface between a surface of the wall 86 and the surrounding air. Such a deflection, as depicted in FIG. 4A, decreases with rotation of the compensator 80 from the position of FIG. 3 to the position of FIG. 4A.

Thus, as the beam 44A exits the wall 86 via the surface 116, it is angled relative to a normal to the surface because of the wedge-like appearance of the wall 86. In accordance with a well-known bending of light at a prism or wedge, the beam 44A is bent at the surface 116, away from its diametric plane 126 of incidence upon the outer surface 88, the vertical plane 126 being indicated by a dashed line. As a result, the beam 44A passes to the side of the central axis 82 with increasing divergence from the plane 126 until the beam 44A intercepts the surface 114. There, the wedge-like appearance of the wall 86 results in a bending of the beam 44A back to a substantially parallel relationship to the plane 126, but offset from the plane 126. In particular, it is noted that the offset of the exiting beam 44A from the plane 126 is in a direction to the left of the plane 126. The reverse manner of deflection occurs for the beam 44C in FIG. 4C which exits the compensator 80 along a path substantially parallel to its vertical plane 126 with an offset directed in the opposite direction from that of FIG. 4A. As can be seen from FIG. 4B, when the compensator is rotated to the 90°–270° position no offset is imparted to the beam 44. Thus, there is symmetry with respect to beam offsets relative to the vertical plane 126 during rotation of the compensator 80. Since the amount of offset is due to the amount of wedge angle in the vicinity of the plane 126, it can be seen that continued rotation toward the position of FIG. 3 operates to maximize the offset imparted to the beam. Thus, there is a correspondence between angular orientation of the compensator 80 relative to the incident beam and the amount of offset in the resultant exiting beam. The relationship becomes substantially linear for substantially small wedge angles, in the range of zero to a few degrees, wherein the sine of an angle is substantially equal to the angle itself in radians. The portrayals of the end views of the compensator 80 in FIGS. 3 and 4A–4C show exaggerated curvature from those actually employed in a preferred embodiment of the invention to facilitate a viewing of the variation in thickness of the tubular wall 86. This has been accomplished by using a greater amount of offset of the centers 118 and 120 from the central axis 82, than is actually employed in the preferred embodiment. For example, in the preferred embodiment of the invention, the amount of offset of either of the centers 118 and 120 of curvature of the semicircular surfaces 114 and 116 is equal approximately to 1/30 of the radius of curvature. The radius of curvature of the inner surface 90 is equal approximately to ⅔ of the radius of the outer surface 88.

Figure 6:
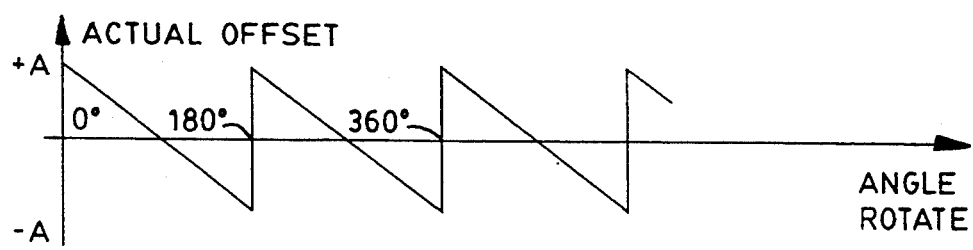
FIG. 6 is a graph of actual offset of a beam propagating through the compensator of FIGS. 1, 2, and 3 as a function of rotational angle of the compensator relative to the orientation of an incident beam of light.

The graph of FIG. 6 shows the actual offset of a beam exiting the compensator 80 as a function of angle of rotation of the compensator 80. In the case of a beam entering the compensator 80, wherein the compensator 80 is oriented at 90 degrees relative to the incident beam, as in the case of the beam 44B of FIG. 4B, there is zero offset in the beam as it exits the compensator 80. To facilitate the description of the operation of the compensator 80, it is convenient to describe a beam offset as being positive for beams traversing the compensator 80 in the quadrants from zero degrees to 90 degrees and 180 degrees to 270 degrees as shown in FIG. 4C, and to describe the beam offset as being negative for beams traversing the compensator 80 in the quadrants from 90 degrees to 180 degrees and 270 degrees to 360 degrees as shown in FIG. 4A. Due to the symmetry in the construction of the compensator 80, the offset to a beam exiting in the third quadrant between 180 degrees and 270 degrees is the same as that of a beam exiting the first quadrant between zero degrees and 90 degrees. Similarly, in the case of a beam exiting from the fourth quadrant between 270 degrees and zero degrees, the offset is the same as that for a beam exiting from the second quadrant between 90 degrees and 180 degrees. In the graph of FIG. 6, the maximum offset has a magnitude A which is attained for a beam exiting near, but not at, the cusps 132. As may be discerned by inspection of FIGS. 4A–4C, and as is shown in FIG. 6, a beam exiting in the first quadrant, near zero degrees, has a maximum positive value of offset, this value decreasing with rotation of the compensator 80 towards a beam exit location at 90 degrees (FIG. 4B). With further rotation of the compensator 80 to provide a beam exit location at the point greater than 90 degrees (FIG. 4A), the amount of offset begins to increase in the negative direction and continues to increase in the negative direction with further rotation of the compensator 80 to bring the exit point towards the location at 180 degrees. This relationship continues periodically with a period of 180 degrees, resulting in the sawtooth shape of the graph of FIG. 6.

The direction of view of the compensator 80 in FIGS. 4A-4C is the same direction of view of the compensator 80 as is presented in FIG. 1. The foregoing convention of positive and negative offsets is selected such that a positive offset deflects the beam in the direction of motion of the film sheet 28, and a negative offset deflects the beam in the direction opposite to the motion of the sheet 28. In FIG. 5A, the width of the uncompensated scan lines A-C shows that the amount of smear that must be compensated by the offset. The required amount of offset is attained by rotating the compensator 80 in the clockwise direction, as shown in FIGS. 4A-4C. By way of example, assuming that the second quadrant (90°-180°) is facing the recording medium, or film sheet 28 (FIG. 4A), at the beginning of a scanning motion of the beam 44, the beam 44 impinges upon the sheet 28 at a location having a substantial negative offset. Later during the same line exposure by the beam 44, the compensator 80 rotates clockwise so that the 90° axis comes into view of the sheet 28 as shown in FIG. 4B at which point the amount of beam offset is substantially zero. Still later, during the same line exposure by the beam 44, further clockwise rotation of the compensator 80 presents the first quadrant (0°-90°) to the sheet 28 as shown in FIG. 4C resulting in a positive offset to the beam position. Therefore, during rotation of the compensator 80, the offsetting of the beam changes linearly such that the beam position moves forward with the forward motion of the sheet 28. By proper adjustment of the rate of rotation of the compensator 80 to match the motion of the sheet 28, the accumulated offset matches the forward movement of the sheet 28 during each line exposure thereby eliminating line smear and overlap as shown in FIG. 5B.

In the construction of the printer 20 of FIG. 1, in the event that the beam 44 is to expose each line at only one spatial width, then there is only one value of differential displacement between the scan line and film sheet 28 which is to be nulled. Accordingly, the radii of curvature of the semicircular cylindrical surfaces 114 and 116 (FIG. 4), and the offsets of their centers 118 and 120 to the central axis 82 are selected to provide the necessary beam offset to null the inclination during a rotation of the compensator 80 by an amount of 180 degrees. In this case, the compensator 80 can rotate continuously with a periodicity of 180 degrees of rotation during each line exposure of the beam 44. The synchronizer 74 (FIG. 1) synchronizes the movement of the compensator 80 such that, at the beginning of each scanning sweep of the beam 44, either the reference point of zero degrees or of 180 degrees of the compensator 80 is facing the film sheet.

Figure 7:
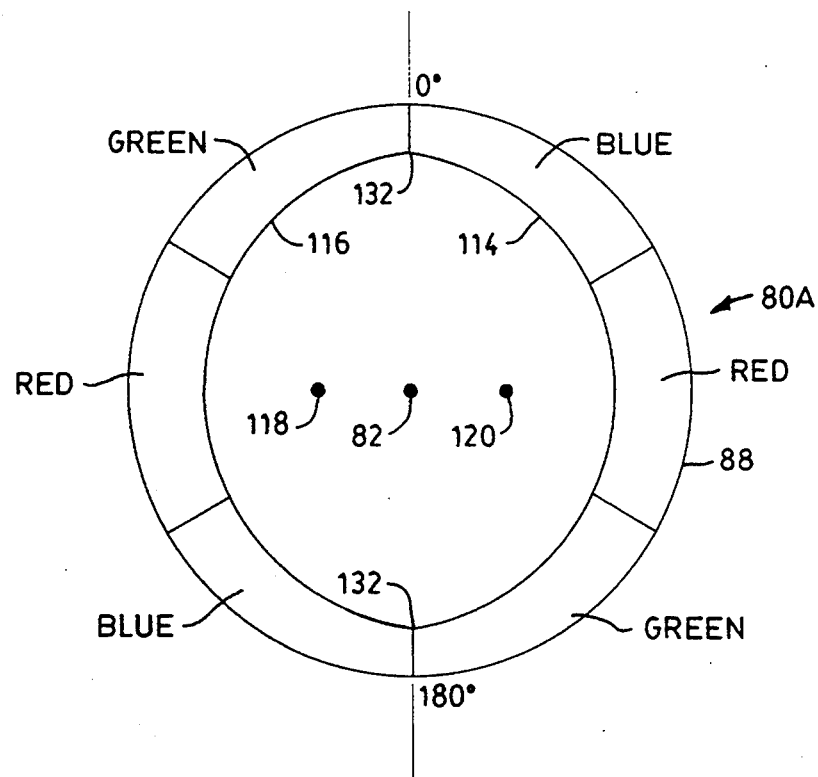
FIG. 7 shows an alternative embodiment of the compensator wherein transparent material of a tubular wall of the compensator is replaced with regions of colored filter material.

FIG. 7 shows a compensator 80A which has the same configuration as the compensator 80 of FIG. 4. However, in the compensator 80 of FIG. 7, the construction is altered to provide for a succession of blue, red, and green filter regions aligned with the semicircular surface 114 and a second set of blue, red, and green regions aligned with the semicircular surface 116. This construction of compensator is useful for printing of color images upon the sheet 28.

In FIG. 7, each of the colored regions extends through 60 degrees of arc. Rotation of the compensator 80A through the green filter region is sufficient to offset the film advancement so that the beam 44 follows the moving film sheet 28 to provide the narrow print line. The print line has a green color because of the passage of the beam through the green filter regions of the compensator 80A. The compensator 80A continues to rotate so that during the next exposure cycle of the beam 44, the beam 44 passes through the red filter regions of the compensator 80A to produce a print line having a red color. However, since the offsetting of the beam 44 is exactly in step with the movement of the film sheet 28, the red print line falls directly on top of the previously printed green print line. Continued rotation of the compensator 80 brings the blue filter region into position for interaction with the next print of the beam 44 to color the beam blue. This produces a blue print line. However, since the accumulated offset of the beam position is exactly in step with the movement of the film sheet 28, the blue print line falls directly upon the previously printed red and green print lines. As is well known in the art of instant color photography, the illumination of a region of the film sheet 28 with the three primary colors green, red, and blue, in cooperation with the chemicals used to develop a color image, produces a colored image on the film sheet 28.

In the operation of the printer 20 (FIG. 1) to accomplish the foregoing color printing, the synchronizer 74 addresses the memory 30 to provide intensity data for a green line exposure, followed by intensity data for a red line exposure, followed by intensity data of a blue line exposure of the beam 44 to produce a single colored line exposure of individual pixels on the sheet 28. Further rotation of the compensator 80A past a cusp 132 at the interface between the surfaces 114 and 116 resets the accumulated beam offset. The sequence of three scans of differing colors is resumed to produce a single multicolored compensated pixel line exposure on the sheet 28 by rotation of the compensator 80A.

FIGS. 8A-8C show a compensator 80B which is an alternative embodiment to the compensator 80 of FIG. 4. The compensator 80B is constructed by reversing the locations of the optical surfaces of the compensator 80 of FIG. 4. Thus, in the compensator 80B of FIG. 7, a circular cylindrical surface 88B is provided as an inner cylindrical surface of a tubular wall 86B, a first semicircular cylindrical surface 114B is provided as a portion of the outer surface of the tubular wall 86B, and a second semicircular cylindrical surface 116B is provided as the remaining portion of the inner surface of the tubular wall 86B. Also shown in FIGS. 8A-8C, respectively, are three beams 134A, 134B, and 134C. In FIG. 8B, the beam 134B traverses a central plane and experiences no offsetting. The beam 134A in FIG. 8A exits the second quadrant and experiences an offsetting in the positive direction as compared to the negative offset experienced by the beam 44A in FIG. 4A. The displacement of the beam 134C in FIG. 8C is in the negative direction as compared to the positive offset of the corresponding beam 44C in FIG. 4C. Due to the reversal of the sense of offset in the embodiment of FIGS. 8A-8C, as compared to the embodiment of FIGS. 4A-4C, the compensator 80B of FIGS. 8A–8C would be rotated in the counterclockwise direction rather than the clockwise direction of the compensator 80 to offset the advancement of the film sheet 28 to produce the narrow exposure lines of FIG. 5B. Red, green, and blue coloring may be introduced into the compensator 80B, in a manner analogous to that shown in FIG. 7, or the compensator 80B may be fabricated of transparent material as provided for the compensator 80 of FIG. 3.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. An optical printer for exposing a recording medium comprising:
    means for imaging an elongated exposing light beam across the recording medium;
    transport means for introducing a relative motion between the recording medium and said elongated exposing light beam in a direction substantially perpendicular to the length of said elongated exposing light beam, said motion operating to expose a wider line across the recording medium than the width of said elongated exposing light beam; and
    compensation means disposed in the path of said elongated exposing light beam for interacting with said elongated exposing light beam to move said elongated exposing light beam in concert with the recording medium movement so as to expose a line across the recording medium substantially no wider than the elongated exposing light beam, said interaction with said elongated exposing lightbeam occurring within an optical tubular element having an inner surface and an outer surface, said elongated exposing light beam propagating through said inner and said outer surfaces, at least a part of said inner surface and a part of said outer surface being inclined relative to each other with an inclination for deflecting said beam.

2. An optical printer for exposing a recording medium comprising
    light means fixedly disposed within said optical printer for receiving electronic image data and for propagating said electronic image data via an image modulated light beam;
    transport means for providing a relative motion between said recording medium and said light means along a path substantially perpendicular to a length of said image modulated light beam;
    compensation means disposed in a path of said image modulated light beam for interacting with said image modulated light beam and being rotatable to deflect said image modulated light beam in concert with movement of the recording medium; and
    means for rotating said compensation means about a central axis thereof in synchronism with the relative motion of said transport means.

3. An optical printer according to claim 1 wherein, in said optical tubular element, the inclination varies from one part of said tubular element to another part of said tubular element, said tubular element being movable to vary a deflection of said beam.

4. An optical printer according to claim 3 wherein said compensation means further includes means for rotating said tubular element about a central axis thereof in synchronism with the relative motion of said transport means for introducing said relative motion between said elongated exposing light beam and the recording medium.

5. An optical printer according to claim 4 wherein, with respect to said inner surface and said outer surface of said tubular element, one of said surfaces has a circular cylindrical shape and the other of said surfaces comprises two semicircular cylindrical sections.

6. An optical printer according to claim 5 wherein said two semicircular cylindrical sections are equal in radius.

7. An optical printer according to claim 6 wherein centers of said two semicircular cylindrical sections are displaced relative to each other along a common diameter of said two circular cylindrical surfaces.

8. An optical printer according to claim 7 wherein said inner surface of said tubular element comprises said two semicircular cylindrical sections, and said outer surface of said tubular element comprises said circular cylindrical surface.

9. An optical printer according to claim 8 wherein one of said two semicircular cylindrical sections is displaced toward the other of said two semicircular cylindrical sections to form a pair of cusps at an interface between two semicircular cylindrical sections.

10. An optical printer according to claim 9 further comprising a signal source for generating said elongated exposing light beam to imprint markings on said recording medium, said recording medium being a photosensitive recording medium.

11. An optical printer according to claim 10 wherein said tubular means comprises a red filter, a green filter, and a blue filter, each of said filters being disposed between one of said two semicircular cylindrical sections, and said circular cylindrical surface.

12. An optical printer according to claim 1 further comprising a signal source for generating said elongated exposing beam to imprint markings on said recording medium, said recording medium being a photosensitive recording medium.

13. An optical printer for exposing an image onto a recording medium comprising
    image transmission means for transmitting image data representing one of at least three colors in a single line across said image;
    illumination means fixedly disposed within said optical printer for receiving said image data and for converting said image data to an image modulated light beam to expose the one of at least threes colors across a single line of said recording medium;
    transport means for introducing a relative motion between said recording medium and said illumination means along a path substantially perpendicular to said image modulated light beam; and
    compensation means disposed in a path of said image modulated light beam for interacting with said image modulated light beam to deflect said image modulated light beam in concert with the relative motion of the recording medium so as to expose subsequent color lines on top of the single line of the recording medium.

14. An optical printer according to claim 13 further comprising synchronous rotation means for driving said compensation means in a rotational motion synchronously with the relative motion of the recording medium.

15. An optical printer according to claim 13 wherein said interaction with said image modulated light beam occurs within an optical tubular element having an inner surface and an outer surface, said image modulated light beam propagating through said inner and said outer surfaces, at least a part of said inner surface and a part of said outer surface being inclined relative to each other with an inclination for deflecting said image modulated light beam.

16. An optical printer according to claim 15 wherein in said optical tubular element the inclination varies from one part of said tubular element to another part of said tubular element, said tubular element being movable to vary a deflection of said image modulated light beam.

17. An optical printer according to claim 15 wherein, with respect to said inner surface and said outer surface of said tubular element, one of said surfaces has a circular cylindrical shape and the other of said surfaces comprises two semicircular cylindrical sections.

18. An optical printer according to claim 17 wherein said inner surface of said tubular element comprises two semicircular cylindrical sections and said outer surface of said tubular elements comprises said circular cylindrical surface.

19. An optical printer according to claim 15 wherein said compensation means further includes means for rotating said tubular element about a central axis thereof in synchronism with the relative motion of said transport means for introducing said relative motion between said image modulated light beam and the recording medium.

* * * * *